United States Patent
Sjothun

(10) Patent No.: US 8,107,973 B1
(45) Date of Patent: Jan. 31, 2012

(54) CLASS STRUCTURED LOCATION BASED SERVICES

(75) Inventor: Jon Sjothun, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 714 days.

(21) Appl. No.: 12/187,816

(22) Filed: Aug. 7, 2008

(51) Int. Cl.
*H04M 11/04* (2006.01)
*H04L 29/06* (2006.01)
*G01C 21/00* (2006.01)

(52) U.S. Cl. .............. 455/456.3; 455/404.2; 455/414.3; 701/207

(58) Field of Classification Search .............. 455/456.3, 455/414.1; 701/207
See application file for complete search history.

(56) References Cited

U.S. PATENT DOCUMENTS

| | | | | |
|---|---|---|---|---|
| 6,167,255 A | * | 12/2000 | Kennedy et al. | 455/414.1 |
| 6,640,184 B1 | * | 10/2003 | Rabe | 701/207 |
| 2004/0176104 A1 | * | 9/2004 | Arcens | 455/456.3 |

* cited by examiner

*Primary Examiner* — George Eng
*Assistant Examiner* — Nizar Sivji
(74) *Attorney, Agent, or Firm* — Parks IP Law LLC; Mickki D. Murray, Esq.

(57) ABSTRACT

A system for providing class structured location based services can include a memory and a processor. The memory can store instructions for execution by a processor, and rules. The processor can use location information provided by a location component, and the rules stored in the memory to analyze an attempted use of location based services. The system can determine whether the attempted use should be allowed based upon classification of the location based service and comparison of the classified service to classes defined by rules. Many classes can be included, and override conditions can be defined. Some methods for providing class structured location based services are also disclosed.

20 Claims, 7 Drawing Sheets

CLASS STRUCTURED LOCATION BASED SERVICES

TECHNICAL FIELD

The present disclosure relates generally to wireless communications. More particularly, the present disclosure relates to systems and methods for providing class structured location based services over wireless networks.

BACKGROUND

Some wireless networks provide users with location based services. Location based services (LBS) can use the location, or approximate location, of a wireless device to provide services to a user. Network operators can also use location information in analysis of infrastructure, usage patterns, and the like. For example, some wireless devices now include global positioning system (GPS) capability for determining the location of the wireless device for navigation, rescue, or other purposes. Some devices include other systems and methods of determining the location of the device such as, but not limited to, triangulation using network and/or WIFI® resources, assisted GPS, E911, satellite links, and the like.

The sophistication of wireless devices, wireless networks, and wireless device users are making some sophisticated device capabilities more commonplace. For example, visual voicemail, which was once unavailable for wireless devices, is becoming a popular feature on some devices. Other sophisticated device capabilities can be implemented by wireless networks or the wireless devices to provide users with services. Location based services can require interaction between the wireless network and wireless devices, or components of the wireless networks or devices. As the number of users employing location based services rises, the network and device infrastructure needed to support these services may need to be improved to provide an enjoyable customer experience.

SUMMARY

A user, or an account holder may wish to limit the availability of location information for privacy concerns. For example, a user may wish to deny access to location information by visited web site, network operators, other friends or family members, or any other unauthorized uses. A user or account holder may wish to allow a user of the device to request and use location services locally, for example, to run a GPS navigation application at the device. However, the user may wish to deny access to location information by governmental entities, commercial entities, or other unauthorized private entities. Additionally, or alternatively, the user may wish to disallow access to location information by ay remote entity for privacy concerns. Additionally, the user may wish to deny the communication of location information for substantially the same privacy concerns described above. According to some embodiments of the disclosure, the user described above can allow certain local requests and uses, while disallowing certain remote requests, remote uses, governmental requests, governmental uses, transfer requests, transfer attempts, commercial requests, and/or commercial uses.

Furthermore, a user, or an account holder, may wish to limit the availability of location information for safety concerns. For example, an account holder with a family plan may wish to disable location information for children, and particularly for adolescent children, who use or have access to a device associated with the account. By disabling the ability of the device to use or send location information, the account holder can prevent the sharing of location information with third parties. On the other hand, some third party uses are legitimate and an account holder may want to allow certain uses for safety reasons. For example, a phone tracking application may be a remote software application that queries a device for its current location. The location can be reported back to the software for communication to the account holder. A parent with a child could use such software to verify or ascertain the child's location. On the other hand, the parent may wish to disable the ability of the child to communicate the child's location to a third party, for example, a social networking site. The present disclosure provides systems and methods for configuring location services. In some embodiments, types of services are divided into classes, and services are provisioned or denied based upon what class the services can be categorized. In some embodiments, the entities requesting and using the location information are examined and rules or policies are enforced based upon the requestor and the user. According to some embodiments of the present disclosure, the parent described above could allow and/or disallow some local requests, remote requests, or other types of requests or uses. For example, the parent described above could disallow some local location information requests and allow certain remote requests for location information.

Furthermore, a user, network operator, or account holder may wish to limit the availability of location information for liability reasons. A network operator could be concerned that the sharing of location information could be unsafe for network users since it could be exploited by people with nefarious motivations. As such, the network operator could limit or deny the availability of location information, the level of accuracy of the location information, and the like. For example, the network operator could create a class for location information requests made after dark by third parties. If a remote request is made after dark, the location information can be restricted, denied, or generalized to prevent a third party from ascertaining the user's exact location. The network operator could be concerned about liability on the part of the network operator for providing location information that is eventually used for criminal, illegal, or otherwise improper or inappropriate purposes. It should be understood that a network operator may wish to limit liability for issues related to safety of the user, privacy of the user, other concerns, and the like.

Accordingly, an embodiment of the disclosure includes a system for providing management of location based services for a wireless device. The system can include one or more processors in communication with one or memory devices. The processors can execute instructions stored in the at memory devices. One or more location components can communicate with the system, or a component thereof. The location components can determine a location of the wireless device for use in providing a location based service to the wireless device or to a third party. The instructions can include rules that define, at least partially, at least two classes of location based services and one or more location applications. The location applications can analyze requests for location based services, classify the requested location based services, and determine if the location based service should be allowed to use the location of the wireless device. In some embodiments, the location components can include at least one GPS receiver. The GPS receiver can included in the wireless device, or can be in communication with the wireless device. In some embodiments, the wireless device is operatively linked and in communication with a cellular network, and the location components can include one or more nodes of the cellular network. In some embodiments, one or more of the classes can be defined by whether the request for the location of the wireless device is initiated at the wireless device. In some embodiments, one or more of the classes can be defined by whether the location of the wireless device intended for use at the wireless device. In some embodiments, at least four classes can be included. A first class can include requests for location information made at the wireless device, and use of the location information at the wireless device. A second class can include requests for location information made at the wireless device, and use of the location information by an entity other than the wireless device. A third class can include can include requests for location information made by an entity other than the wireless device, and use of the location information at the wireless device. A fourth class can include requests for location information made by an entity other than the wireless device, and use of the location information by an entity other than the wireless device. In some embodiments, one or more of the classes can be defined by whether the location of the wireless device is requested by an emergency service entity. In some embodiments, one or more of the classes can be defined by whether the location of the wireless device is requested by a commercial entity.

Another embodiment of the disclosure includes a method for providing management of location based services for a wireless device. The method can include executing, with a processor, instructions stored in the data storage device to analyze a request for at least one location based service. The request for at least one location based service can include an attempt to use the location of the wireless device for providing the at least one location based service. The method can further include accessing rules that define at least two classes of requests for location based services. The requested service can be classified in at least one of the at least two classes. A rule that indicates if the location of the wireless device can be used to provide the requested location based service can be determined. The determination can be based upon into which class the request the location based service is classified. The determined rule can be communicated to an enforcement entity to allow or disallow the intended use of location information. In some embodiments, the method further includes storing, in a data storage device, at least two rules that define, at least partially, at least two classes of location based services. In some embodiments, the enforcement entity is the wireless device. In some embodiments, the wireless device is connected to a cellular network, and the enforcement entity is a node on the cellular network to which the wireless device is in communication. In some embodiments, the method includes receiving a command to store rules that define at least two classes of requests for location based services in a data storage device. In some embodiments, the stored rules can be updated, changed, replaced, or removed.

Another embodiment of the disclosure includes a computer-readable medium for storing instructions that, when executed, perform steps that allow management of location based services for a wireless device. The steps can include analyzing a request for at least one location based service. The request for at least one location based service can include an attempt to use the location of the wireless device for providing the at least one location based service. The steps can further include accessing rules that define at least two classes of requests for location based services. The requested service can be classified in at least one of the at least two classes. A rule that indicates if the location of the wireless device can be used to provide the requested location based service can be determined. The determination can be based upon into which class the request the location based service is classified. The determined rule can be communicated to an enforcement entity to allow or disallow the intended use of location information. In some embodiments, the steps can further include storing, in a data storage device, at least two rules that define, at least partially, at least two classes of location based services. In some embodiments, the enforcement entity is the wireless device. In some embodiments, the wireless device is connected to a cellular network, and the enforcement entity is a node on the cellular network to which the wireless device is in communication. In some embodiments, the steps can include receiving a command to store rules that define at least two classes of requests for location based services in a data storage device. In some embodiments, the stored rules can be updated, changed, replaced, or removed.

These and additional features of the present disclosure with become apparent with reference to the attached drawings, wherein:

DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
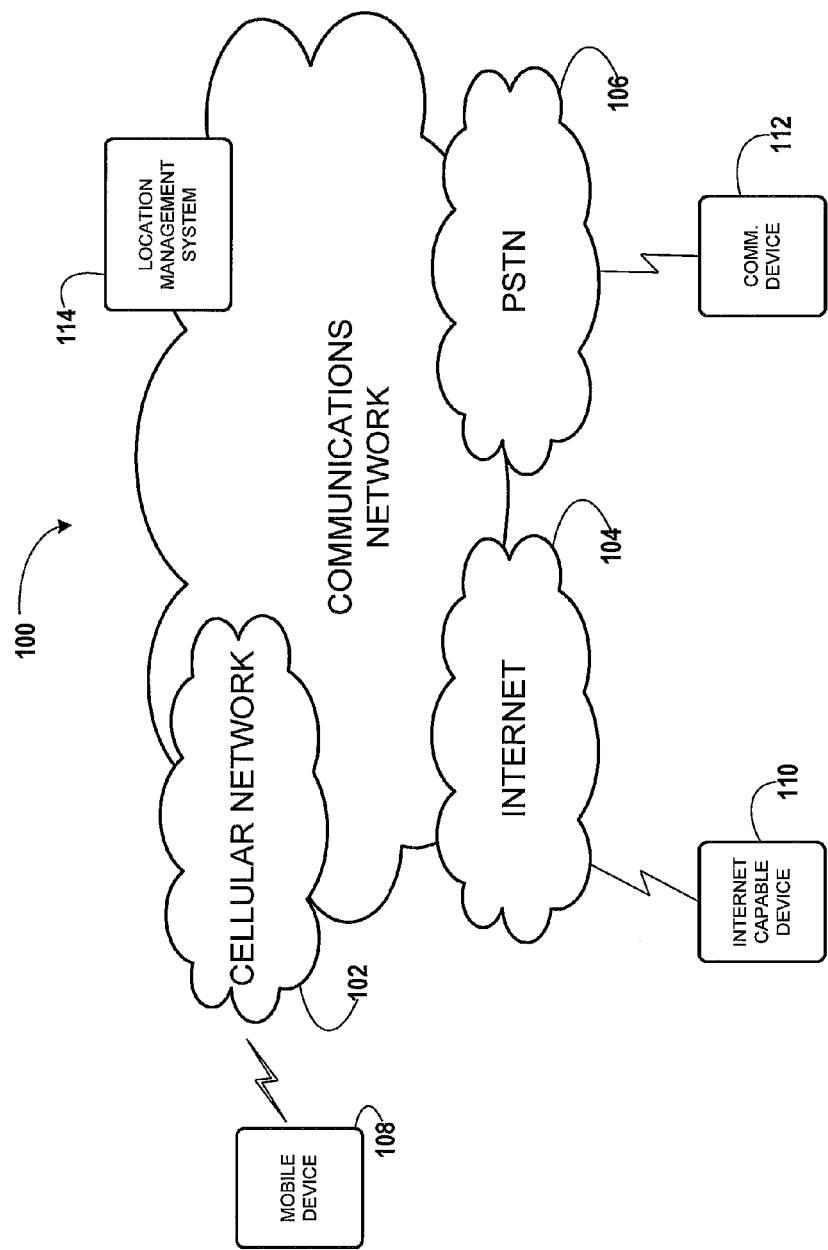
FIG. 1 schematically illustrates an exemplary communications network with which embodiments of the present disclosure can be implemented.

Referring now to the drawings in which like numerals represent like elements throughout the several views, FIG. 1 schematically illustrates an exemplary communications network 100. The illustrated exemplary network 100 includes a cellular network 102, a packet data network 104, for example, the Internet (the Internet), and a circuit switched network 106, for example, a publicly switched telephone network (PSTN). The cellular network 102 can include various components such as, but not limited to, base transceiver stations (BTS's), Node-B's, base station controllers (BSC's), radio network controllers (RNC's), mobile switching centers (MSC's), short message service centers (SMSC's), multimedia messaging service centers (MMSC's), home location registers (HLR's), visitor location registers (VLR's), charging platforms, billing platforms, voicemail platforms, GPRS core network components, location service nodes, Internet protocol multimedia subsystem (IMS), and the like. The cellular network 102 can also include radios and nodes for receiving and transmitting voice, data, and combinations thereof to and from radio transceivers, networks, and the Internet 104. A device 108, such as, for example, a cellular telephone, a user equipment, a mobile terminal, a PDA, a laptop computer, a handheld computer, or a combination thereof, can be operatively connected to the cellular network 102.

The cellular network 102 can be configured as a 2G GSM (Global System for Mobile communications) network, and can provide data communications via GPRS (General Packet Radio Service) and EDGE (Enhanced Data rates for GSM Evolution). Additionally, the cellular network 102 can be configured as a 3G UMTS (Universal Mobile Telecommunications System) network and can provide data communications via the HSPA (High-Speed Packet Access) protocol family, for example, HSDPA (High-Speed Downlink Packet Access), EUL (Enhanced Uplink) or otherwise termed HSUPA (High-Speed Uplink Packet Access), and HSPA+ (Evolved HSPA). The cellular network 102 is also compatible with future mobile communications standards including, but not limited to, pre-4G and 4G, for example.

The illustrated cellular network 102 is shown in communication with the Internet 104 and a PSTN 106, though it should be appreciated that this is not necessarily the case. One or more Internet-capable devices 110, for example, a PC, a laptop, a portable device, a device 108, a smart phone, or any other suitable device, can communicate with one or more cellular networks 102, and devices 108 connected thereto, through the Internet 104. It also should be appreciated that the Internet-capable device 110 can communicate with the Internet 104, through the PSTN 106, the cellular network 102, or a combination thereof. As illustrated, a communications device 112, for example, a telephone, facsimile machine, modem, computer, or the like, can be in communication with the PSTN 106, and therethrough to the Internet 104 and/or the cellular network 102. It should be appreciated that the communications device 112 can be an Internet-capable device, and can be substantially similar to the Internet-capable device 110.

The illustrated communications network 100 includes a location management system 114 (LMS). The LMS 114 can be hardware, software, and/or a combination thereof. The LMS 114 can be in communication and/or reside upon the cellular network 102, the Internet 104, the PSTN 106, the device 108. Furthermore, the LMS 114 can be accessible by and/or through multiple devices and networks, including private networks, which are not illustrated in FIG. 1. It should be appreciated that substantially all of the functionality described with reference to the communications network 100 can be performed by the cellular network 102 alone, or in combination with other networks, network elements, and the like, including the illustrated networks, and some elements that are not illustrated.

Figure 2:
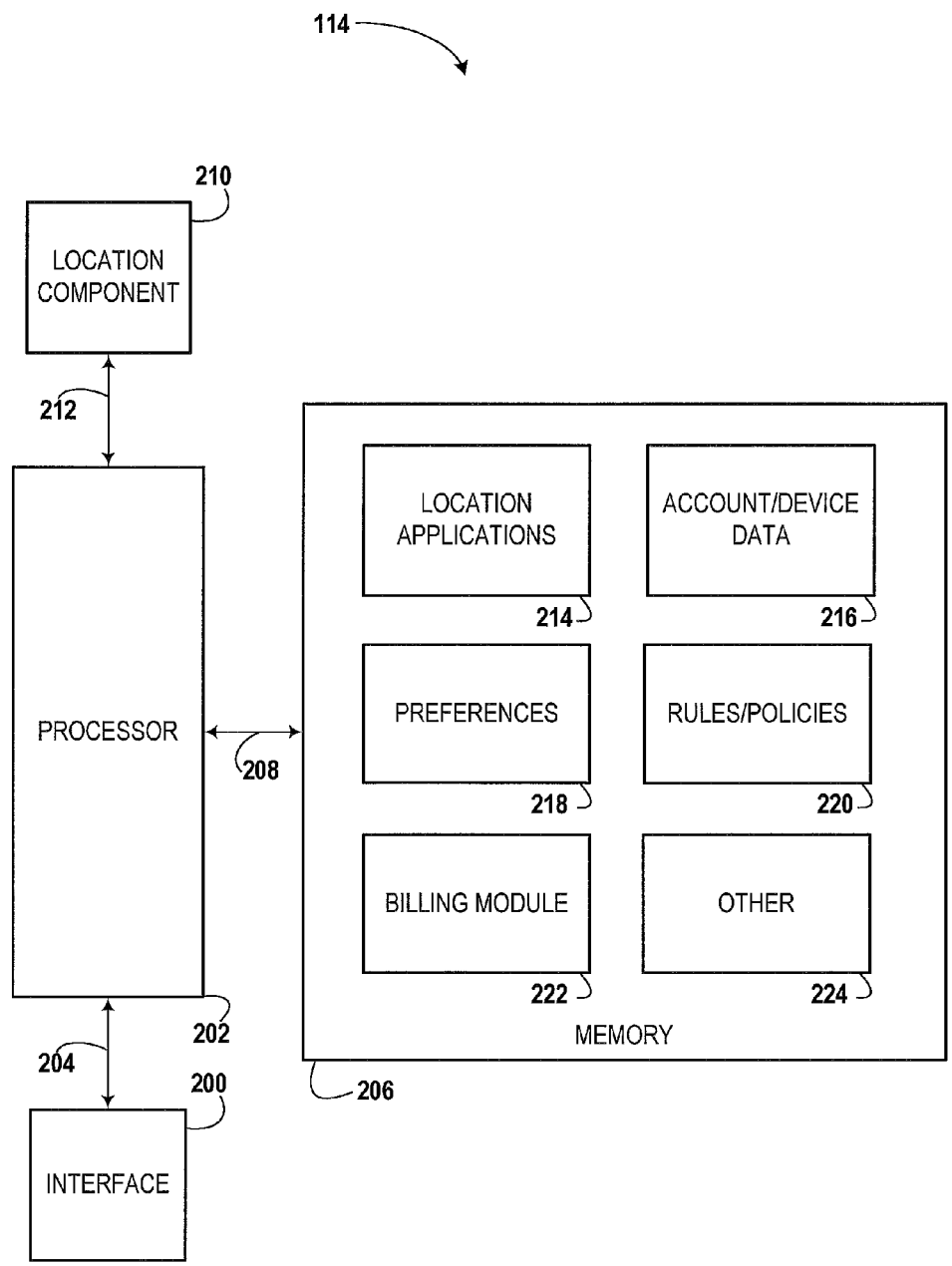
FIG. 2 schematically illustrates a location management system, according to an exemplary embodiment of the present disclosure.

FIG. 2 schematically illustrates a block diagram of an LMS 114 according to an exemplary embodiment of the present disclosure. The illustrated LMS 114 includes a communications network interface 200 that is operatively linked and in communication with a processor 202 via a data/memory bus 204. The communications network interface 200 can be used to allow the LMS 114 to communicate with one or more components of the communications network 100, or any device connected thereto or residing thereon. It should be appreciated that if the LMS 114 resides on mobile device, for example, the device 108, that the communications network interface 200 can be a communications component of the device 108, for example, a short range radio device, a transceiver, receiver, transmitter, antennae, or combinations thereof. The processor 202 is operatively linked and in communication with a memory 206 via a data/memory bus 208. A location component 210 is operatively linked and in communication with the processor 202 via a data/memory bus 212. It should be appreciated that the data/memory busses 204, 208, and 212 can be the same data/memory bus.

The word "memory," as used herein to describe the memory 206, collectively refers to all memory types associated with the LMS 114 such as, but not limited to, processor registers, processor cache, random access memory (RAM), other volatile memory forms, and non-volatile, semi-permanent or permanent memory types; for example, tape-based media, optical media, flash media, hard disks, combinations thereof, and the like. While the memory 206 is illustrated as residing proximate the processor 202, it should be understood that the memory 206 can be a remotely accessed storage system, for example, a server on the Internet 104, a remote hard disk drive, a removable storage medium, combinations thereof, and the like. Moreover, the memory 206 is intended to encompass network memory and/or other storage devices in wired or wireless communication with the LMS 114, which may utilize the communications network interface 200 to facilitate such communication. Thus, any of the data, applications, and/or software described below can be stored within the memory 206 and/or accessed via network connections to other data processing systems (not shown) that may include a local area network (LAN), a metropolitan area network (MAN), or a wide area network (WAN), for example. Accordingly, the present disclosure may operate on the LMS 114, wherein the LMS 114 is configured as a server to one or more client data processing systems as dictated by a client/server model.

The illustrated memory 206 can include one or more location applications 214, account and device data 216, preferences 218, one or more policies 220, one or more billing modules 222, and/or other data 224. Additionally, the other data 224 can include, but is not limited to, data, software, programs, algorithms, billing applications, instructions, applications, and the like, for example, an operating system, hardware data, firmware, and the like (not illustrated).

The one or more location components 210 can include hardware, instructions, programs, applications, software, combinations thereof, and the like, for determining the location of the device 108. It should be appreciated that the one or more location applications 214 can be stored in the memory 206, at a remote storage device, in a storage device residing on the device 108, or in a storage device residing on the location component 210. It should also be understood that the location component 210 can be external to the LMS 114 and/or linked and in operative communication with the communications network interface 200, the memory 206, or the LMS 114. In some embodiments, the LMS 114 is located at the device 108, and the one or more location components 210 can include one or more GPS receivers, A-GPS receivers, one or more transceivers, one or more radios, combinations thereof, and the like. It should be understood that the one or more location components 210 can communicate with external entities, for example, GPS satellites, GPS location services, A-GPS location services, cell towers, wireless network access points, location beacons, and the like.

In some embodiments, the LMS 114 resides on the communications network 100, and the one or more location components 210 can include, one or more wireless network access points, one or more cellular telephone towers, one or more base transceiver stations (BTS's), on or more Node-B's, one or more base station controllers (BSC's), one or more mobile switching centers (MSC's), one or more radio network controllers (RNC's), one or more home location registers (HLR's), one or more visitor location registers (VLR's), and the like. Depending upon the needs or preferences of the user, account holder, network operator, or other authorized entity, the location components 210 can be used to supply location information to various levels of accuracy. In some embodiments, a GPS receiver is used to provide accuracy within a radius of about 1-10 feet. In some embodiments, network triangulation is used to provide accuracy within a radius of about 10-100 feet. In some embodiments, these and other components are used, alone or in combination, to provide accuracy within a radius of about 0.5 feet to about 500 feet. In still other embodiments, the location information is much more general and includes, for example, the network to which the device 108 is connected, the state in which the device 108 is located, the country in which the device 108 is located, and the like. In some contemplated embodiments, the location information includes, but is not limited to, the public land mobile network (PLMN) to which the device 108 is connected, the visiting land mobile network (VLMN) to which the device 108 is connected, the carrier operating the network to which the device 108 is connected, the state, province, city, town, street, or building in which the device 108 is located, and the like.

The account/device data 216 can include data relating to the user's account and/or device 108, including, but not limited to, the user's subscription plan, subscription features, and/or the capabilities of the user's device 108. For example, the LMS 114 can be in communication with one or more billing platforms, subscriber databases, other network nodes, and the like, to receive the account/device data 216 relating to a user's subscription plan, usage, and billing information. Additionally, the account/device data 216 can inform the LMS 114 of the features the user's device 108 supports by indicating the IMEI, serial number, carrier, software version(s), firmware, carrier-specific applications, combinations thereof, or the like. As such, the account device data 216 can indicate if the device 108 supports WIFI®, 3G, 2G, EDGE, GPS, A-GPS, network triangulation, BLUETOOTH®, NFC, and the like. Additionally, the account/device data 216 can indicate whether services provided by the device 108 are charged/billed on a pre-paid and/or post-paid basis, or if features are available on the device 108. The account/device data 216 can pass-through the LMS 114, or can be stored, at least temporarily. The LMS 114 can use the account/device data 216 to determine, for example, how to determine location of the device 108, how to enforce policies, and the like. Additionally, billing, privacy, safety, and/or other concerns can be used to tailor functionality of the LMS 114 through the account/device data 216. For example, a user can disable the functionality of the LMS 114 and store a preference indicating disablement of the LMS 114 in an account setting stored in the account/device data 216. Additionally, the LMS 114 can respond to billing information to adjust functionality of the LMS 114. For example, a notification can be sent from a billing platform to the LMS 114 and the LMS 114 can disable functionality automatically. A user can be given the ability to override deactivation of some, none, or all desired features or functionality.

The preferences 218 can include data relating to a user's preferences for the LMS 114. The preferences 218 can include, for example, an indication as to which functions the user wishes to use to control location requests, power settings, acceptable uses of location information, how the LMS 114 should communicate the user's location information, the level of accuracy of the location information, and the like. It will be understood that users can customize other functions and options of the LMS 114, including, for example, options for bypassing the LMS 114, preferences for types of location determinations, time windows in which to apply the LMS 114, exceptions, and the like. In some embodiments, the user can configure the LMS 114 to use triangulation data relating to the device for third party requests, but to disallow GPS data to restrict the accuracy of the information. Similarly, the user can configure the LMS 114 to use data from an HLR, or other network node, for example, to provide general location information, such as the network the user is accessing, in what state or country the user is currently located, and the like. As such, the user can restrict the accuracy of the information shared to help limit the ability of third parties to exploit the location information for nefarious purposes. Other preferences are possible, and are contemplated.

The policies 220 can include user, account holder, system, governmental, legal, and/or network policies relating to the LMS 114. It should be appreciated that the policies 220 can contain some or all of the information stored in the preferences 218. In some embodiments, the policies 220 are used by the network operator or another authorized party to supplement and/or override the user's preferences 218. For example, in some embodiments, the billed party can configure the policies 220 for all lines for which the billed party pays. This feature could be used by a peron paying for a family plan, by an employer paying for an employee's plan, or the like. Additionally, or alternatively, the network operator can modify the policies 220 to reduce the possibility of liability for unsafe sharing of location information or to restrict or prevent access to location information by unauthorized parties. In some embodiments, the policies 220 automatically override some or all conflicting preferences 218. In some embodiments, the preferences 218 override some or all conflicting policies. In some embodiments, certain preferences 218 and/or policies 220 override conflicting policies 220 and/or preferences 218.

The LMS 114 can also include a billing module 222. The billing module 222 can be used to track, collect, and/or report activities of the LMS 114 to a billing system at the LMS 114, or elsewhere on the communications network 100 for billing purposes. The billing module 222 can track, for example, how many requests and/or how much data is sent and received by the LMS 114 and report this information to a billing system of the communications network 100, for example. Billing and/or charging can be pre-paid or post-paid. The location management system functionality can be charged on any desired basis, including, but not limited to, a per-use basis, as a flat fee, as part of service package, or the like.

The LMS 114 can use the location component 210, the account/device data 216, the preferences 218, the policies 220, other data 224, and/or the billing module 222 to tailor functionality of the LMS 114 in real-time, in near-real-time, or without respect to temporal limitations. The LMS 114 can be configured to give precedence to certain types of requests, for example, requests by emergency responders, local requests, and the like.

Figure 3:
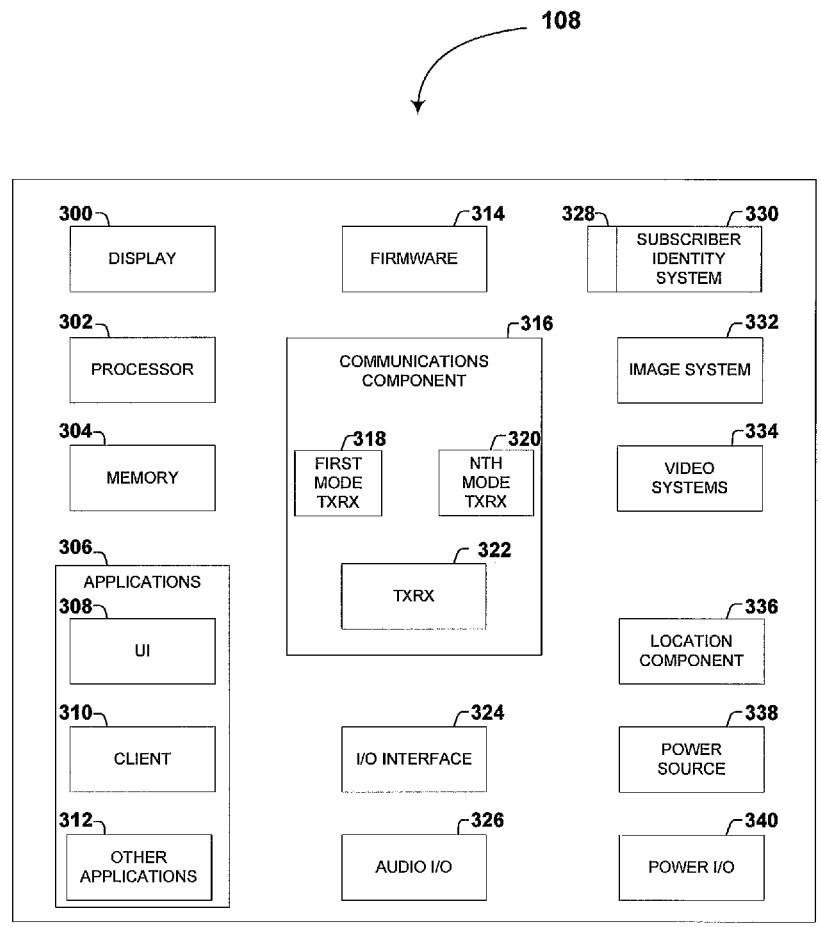
FIG. 3 schematically illustrates a block diagram of an exemplary mobile device for use with exemplary embodiments of the present disclosure.

FIG. 3 illustrates a schematic block diagram of an exemplary device 108 for use in accordance with some exemplary embodiments of the present disclosure. Although no connections are shown between the components illustrated in FIG. 3, the components can interact with each other to carry out device functions.

The device 108 can be a multimode handset. It should be understood that FIG. 3 and the following description are intended to provide a brief, general description of a suitable environment in which the various aspects of an embodiment of the present disclosure can be implemented. While the description includes a general context of computer-executable instructions, the present disclosure can also be implemented in combination with other program modules and/or as a combination of hardware and software. The term "application," or variants thereof, is used expansively herein to include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 108 can include a variety of computer readable media, including volatile media, non-volatile media, removable media, and non-removable media. The term "computer-readable media" and variants thereof, as used in the specification and claims, can include storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 108.

The device 108 can include a display 300 for displaying multimedia such as, for example, text, images, video, telephony functions such as Caller ID data, setup functions, menus, music, metadata, messages, wallpaper, graphics, internet content, device status, preferences settings, map data, location data, and the like. The device 108 can include a processor 302 for controlling, and/or processing data. A memory 304 can interface with the processor 302 for the storage of data and/or applications 306. An application 306 can include, for example, location determination software, location sharing software, web browsing software, mapping software, video player software, voicemail software, conversion software, archival software, audio playback software, music player software, email software, messaging software, combinations thereof, and the like. The application 306 can also include a user interface (UI) application 308. The UI application 308 can interface with a client 310 (e.g., an operating system) to facilitate user interaction with device functionality and data, for example, answering/initiating calls, entering/deleting data, location management systems, configuring settings, address book manipulation, multimode interaction, and the like. The applications 306 can include other applications 312 such as, for example, firmware, visual voicemail software, add-ons, plug-ins, voice recognition, call voice processing, voice recording, messaging, e-mail processing, video processing, image processing, voicemail file archival, converting, and forwarding, music play, combinations thereof, and the like, as well as subsystems and/or components. The applications 306 can be stored in the memory 304 and/or in a firmware 314, and can be executed by the processor 302. The firmware 314 can also store code for execution during initialization of the device 108.

A communications component 316 can interface with the processor 302 to facilitate wired/wireless communications with external systems including, for example, cellular networks, location systems, VoIP networks, LAN, WAN, MAN, PAN, that can be implemented using WIFI®, WIMAX™, combinations and/or improvements thereof, and the like. The communications component 316 can also include a multimode communications subsystem for providing cellular communications via different cellular technologies. For example, a first cellular transceiver 318 can operate in one mode, for example, GSM, and an Nth transceiver 320 can operate in a different mode, for example UMTS. While only two transceivers 318, 320 are illustrated, it should be appreciated that a plurality of transceivers can be included. The communications component 316 can also include a transceiver 322 for unlicensed communications using technology such as, for example, WIFI®, WIMAX™, BLUETOOTH®, infrared, IRDA, NFC, RF, and the like. The communications component 316 can also facilitate communications reception from terrestrial radio networks, digital satellite radio networks, Internet-based radio services networks, combinations thereof, and the like. The communications component 316 can process data from a network such as, for example, the Internet, a corporate intranet, a home broadband network, and the like, via an ISP, DSL provider, or broadband provider.

An input/output (I/O) interface 324 can be provided for input/output of data and/or signals. The I/O interface 324 can be a hardwire connection, such as, for example, a USB, mini-USB, audio jack, PS2, IEEE 1394, serial, parallel, Ethernet (RJ48), RJ11, and the like, and can accept other I/O devices such as, for example, a keyboard, keypad, mouse, interface tether, stylus pen, printer, thumb drive, touch screen, touch pad, trackball, joy stick, microphones, remote control devices, monitor, display, LCD, combinations thereof, and the like. It should be appreciated that the I/O interface 324 can be used for communications between the device and a network or local device, instead of, or in addition to, the communications component 316.

Audio capabilities can be provided by an audio I/O component 326 that can include a speaker for the output of audio signals and a microphone to collect audio signals. The device 108 can include a slot interface 328 for accommodating a subscriber identity system 330 such as, for example, a SIM or universal SIM (USIM). The subscriber identity system 330 instead can be manufactured into the device 108, thereby obviating the need for a slot interface 328. In some embodiments, the subscriber identity system 330 can store certain features, rules, policies, and the like. The subscriber identity system 330 can be programmed by a manufacturer, a retailer, a customer, a network operator, and the like.

The device 108 can include an image capture and processing system 332. Photos and/or videos can be obtained via an associated image capture subsystem of the image system 332, for example, a camera. The device 108 can also include a video component 334 for processing, recording, and/or transmitting video content.

A location component 336, can be included to send and/or receive signals such as, for example, GPS data, A-GPS data, WIFI®/WIMAX™ and/or cellular network triangulation data, combinations thereof, and the like. The location component 336 can interface with cellular network nodes, telephone lines, satellites, location transmitters and/or beacons, wireless network transmitters and receivers, for example, WIFI® hotspots, radio transmitters, combinations thereof, and the like. The device 108 can obtain, generate, and/or receive data to identify its location or can transmit data used by other devices to determine the device 108 location. In some embodiments, the device 108 uses a calendar or presence data to estimate or determine the location of the device 108. The device 108 can include a power source 338 such as batteries and/or other power subsystem (AC or DC). The power source 338 can interface with an external power system or charging equipment via a power I/O component 340.

Figure 4:
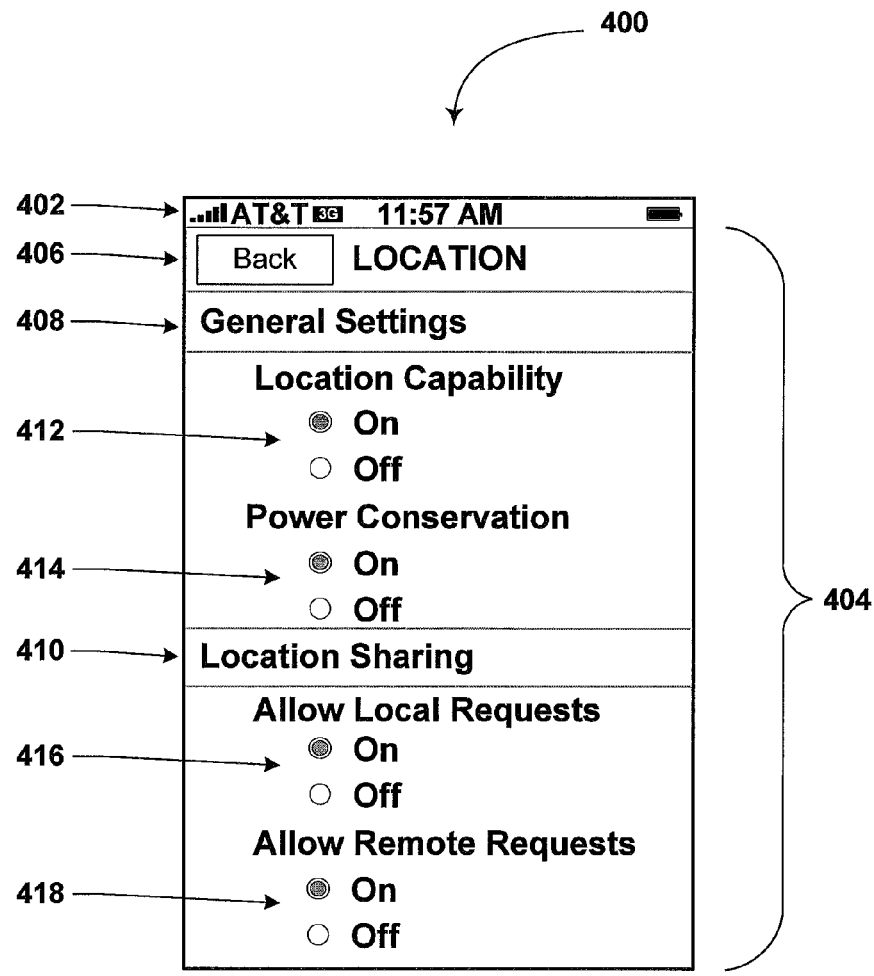
FIG. 4 illustrates a graphical user interface for providing an interface with which to control a location management system, according to an exemplary embodiment of the present disclosure.

FIG. 4 illustrates an exemplary GUI 400 for a device 108, according to an exemplary embodiment of the disclosure. In some embodiments, the GUI 400 is displayed by a video output source on a display 300 of a device 108. As illustrated, the GUI 400 can include operational information 402 for the device 108. The operational information 402 can include network information, for example, a signal meter for displaying the measured strength of a network signal, and information relating to the network with which the device 108 is in communication. In the illustrated GUI 400, the device 108 is indicating a maximum signal strength and that the device 108 is currently connected to the AT&T 3G (third generation) network. It should be understood that this indication is exemplary only. The GUI 400 can be used on devices operating on other networks, other protocols, and/or operated by other carriers. The operational information 402 can also include, for example, the time of day, a date, a message waiting indicator, a battery meter, a short range radio communications device indicator, an alarm indicator, other information, and the like. In the illustrated GUI 400, an exemplary settings menu 404 is displayed. The illustrated menu 404 includes a title and menu portion 406 and two or more sub menus 408, 410. The illustrated title and menu portion 406 can include one or more options. The illustrated "back" option is but one exemplary option that can be included. Other options are contemplated.

The menu 404 can include a "General Settings" submenu 408 for controlling some exemplary general location service functions of the device 108. It should be understood that the illustrated submenu 408 is exemplary only. The general settings submenu 408 can include, for example, an option 412 to toggle on/off the location capability of the device 108. In some embodiments, toggling the location capability to "off" can deactivate a GPS receiver or other location component 336 of the device 108. In some embodiments, toggling the location capability to "off" can disallow requests from the device 108 to the communications network 100 for location information. In some embodiments, toggling the location capability to "off" can pass an instruction to an LMS 114 or another node on a communications network 100 with instructions to disallow fulfillment of requests for location information. The submenu 408 can also include an option 414 to toggle on/off a power conservation feature. Toggling "on" a power conservation feature can instruct the device 108 to turn off a location component 336 when the location component 336 is not being used. In some embodiments, toggling "on" a power conservation feature can instruct the device 108 to turn off a location component 336 for a period of time. In some embodiments, toggling "on" a power conservation feature can instruct the device 108 to use an A-GPS option, which can give the location component 336 the ability to more quickly ascertain the location of the device 108, and thereby may be helpful in reducing power consumption. In some embodiments, the power conservation option 414 can be used to limit what type of location component 336 is used to determine the location of the device 108. For example, if the device 108 senses a WIFI® access point within range of the device 108, Toggling "on" the power conservation option 414 can cause the device 108 to use the WIFI® access point to determine the device location instead of a GPS receiver or other location component 336 that uses more power than the WIFI® transceiver, for example. In some embodiments, the device 108 can access two or more WIFI® elements, and/or can combine wireless network recognition with other technologies to refine location.

The menu 404 can also include a "Location Sharing" submenu 410 for controlling specific features of the device 108 relating to device location. It should be understood that the illustrated submenu 410 is exemplary only. The location sharing submenu 410 can include, for example, an option 416 to toggle on/off the ability of the device 108 to locally request location information. In some embodiments, a user of a device 108, or an account holder may wish to deactivate the ability of the device 108 to locally request location information. For example, an employer may wish to disallow GPS navigation on the device 108 to force an employee to use a navigation system provided for the employee by the employer. Additionally, a user of the device 108, or an account holder, may wish to deactivate local requests for location to maximize the life of the device power source 338, to prevent unauthorized uses of location information, to prevent personal use of location information, and the like. In the event that local requests for information can be automatically generated by applications running on the device 108, use of this feature can conserve power by disallowing such requests regardless of the application running on the device 108. The location sharing submenu 410 can also include an option 418 to toggle on/off the ability of the device 108 to respond to remote requests for the location of the device 108. As explained above, the ability to deny fulfillment of remote requests for location information can be important to meet certain safety, privacy, performance, and/or liability concerns. At other times, the ability to fulfill remote requests for location information can be important for the owner of the device 108 and/or the account holder.

Although the illustrated GUI 400 does not include additional options or submenus, it should be appreciated that additional menus can allow the Toggling "on"/off of the ability of the device 108 to transmit location information to a third party, to transmit location information for use by a remote application, to use location information locally, to allow use of location information by personal entities, to allow use of location information by commercial entities, to allow use of location information by governmental entities, to allow use of location information by emergency or police personnel, and the like. Options to add, delete, and/or edit exceptions to any defined rules can also be included, as can other menus, submenus, and options.

Figure 5:
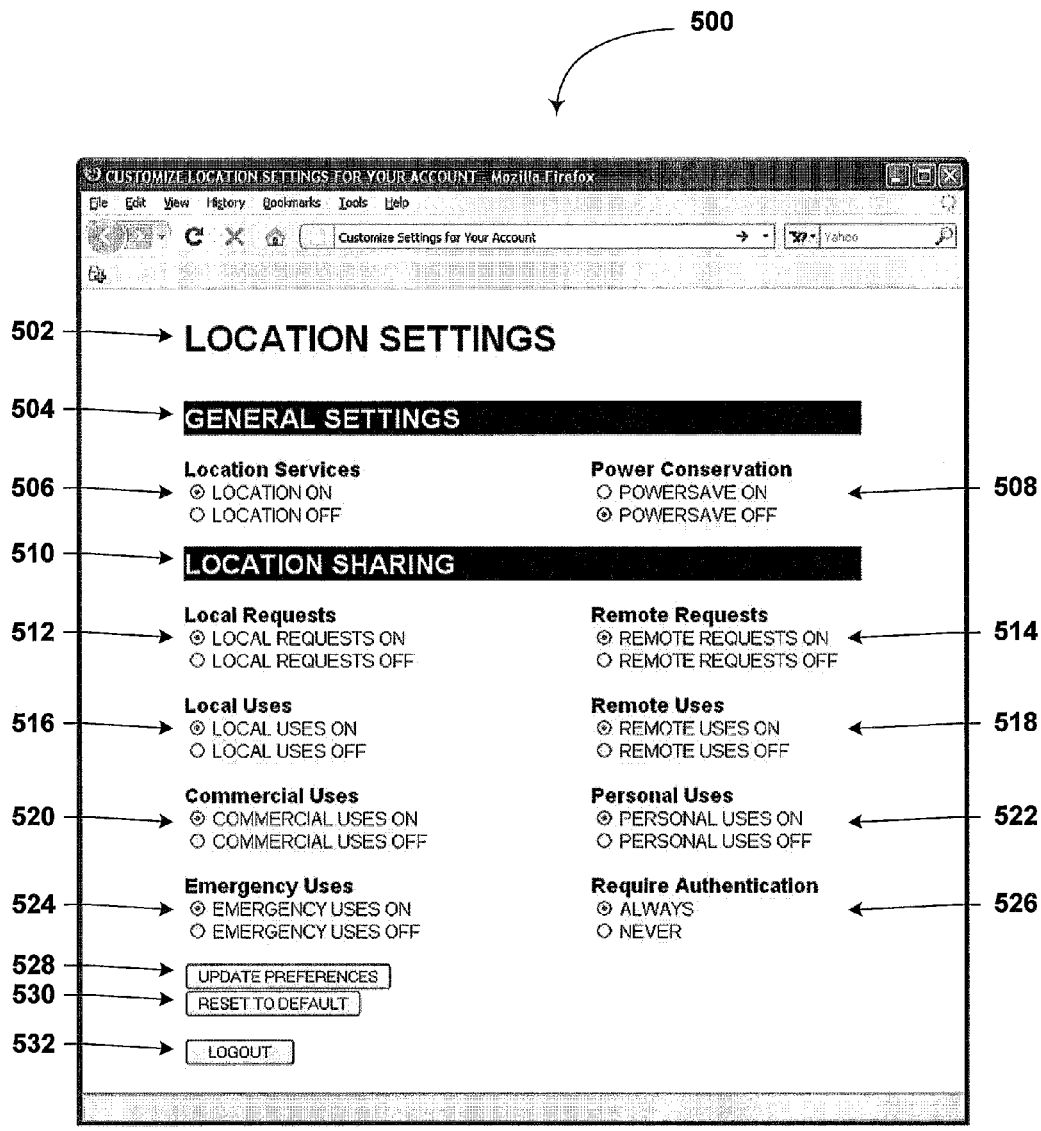
FIG. 5 illustrates an exemplary web-based user interface for providing an interface with which to control a location management system, according to an exemplary embodiment of the present disclosure.

FIG. 5 illustrates an exemplary web-based user interface (WUI) 500 for providing a user with an interface for configuring settings of an LMS 114, according to an exemplary embodiment of the present disclosure. It should be understood that the illustrated WUI 500 illustrates an exemplary embodiment of a user interface. Additional and/or alternative options, menus, layouts, and the like, can be included or substituted without departing from the scope of the appended claims. Selections made via the WUI 500 can be communicated to an LMS 114 associated with a user, to a device 108, to a node on the communications network 100, and the like.

The WUI 500 includes a location settings menu 502 with one or more exemplary submenus. The menu 502 includes a "General Settings" submenu 504 for setting some exemplary general functionality of the LMS 114. The general settings submenu 504 includes an option 506 for Toggling "on"/off the location services associated with a user's account. The general settings submenu 504 can also include an option 508 for Toggling "on"/off a power conservation option. If a the power conservation option 508 is toggled "on", the LMS 114 can communicate the choice to a device 108 and the device 108 can reduce power to the location component 336, or turn off the location component 336 when not in use, turn off the location component 336 for a period of time, and/or disable the location component 336 until the power conservation option is toggled to "off."

The location settings menu 502 also includes a location sharing submenu 510 for setting exemplary location sharing options of the LMS 114. The options illustrated are exemplary only. Additional and/or alternative options are possible and contemplated. The location sharing submenu 510 can include request-based options 512, 514. The option 512 can be used to toggle on/off the ability of the LMS 114 to fulfill local location requests. It should be appreciated that if the LMS 114, or location software associated with the LMS 114, resides at the device 108, the option 512 can toggle on/off the ability of the device 108 to make and/or fulfill local location information requests. With respect to the LMS 114, "local location request" can include initiation, at a device 108 associated with the LMS 114, a request for location information. The option 514 can be used to toggle on/off the ability of the LMS 114 to fulfill remote location requests. It should be appreciated that if the LMS 114, or location software associated with the LMS 114, resides at the device 108, the option 514 can toggle on/off the ability of the device 108 to make and/or fulfill remote location information requests. With respect to the LMS 114, "remote location request" can include a request for location information from a remote system or node to a device 108.

The location sharing submenu 510 can also include use-based submenus 516, 518, 520, 522, 524. The options illustrated are exemplary only. Additional and/or alternative options are both possible and contemplated. The option 516 can be used to toggle on/off the ability of the LMS 114 to fulfill location requests intended for use by the device 108 locally. It should be appreciated that if the LMS 114, or location software associated with the LMS 114, resides at the device 108, the option 516 can toggle on/off the ability of the device 108 to use location information at the device 108. The option 518 can be used to toggle on/off the ability of the LMS 114 to fulfill location information requests intended for use by a remote system. It should be appreciated that if the LMS 114, or location software associated with the LMS 114, resides at the device 108, the option 518 can toggle on/off the ability of the device 108 to send location information to a remote system or node. The option 520 can be used to toggle on/off the ability of the LMS 114 to fulfill location requests intended for use by a commercial entity. Whether or not a location request is intended for use by a commercial entity can be determined by the entity that initiates the request, history files, and the like. It should be appreciated that if the LMS 114, or location software associated with the LMS 114, resides at the device 108, the option 520 can toggle on/off the ability of the device 108 to send location information to an entity intending to use the location information for a commercial purpose. The option 522 can be used to toggle on/off the ability of the LMS 114 to fulfill location information requests intended for personal use. It should be appreciated that if the LMS 114, or location software associated with the LMS 114, resides at the device 108, the option 522 can toggle on/off the ability of the device 108 to use location information for personal uses, or to send location information to a remote system or node intending to use the location information for personal uses. The option 524 can be used to toggle on/off the ability of the LMS 114 to fulfill location information requests intended for emergency use, such as E911. In some embodiments, the emergency use option 524 can override all other request-based and/or use-based settings. In some embodiments, the emergency use option 524 is set by a device manufacturer, a network operator, an account holder, or the like, and cannot be altered by a user. It should be appreciated that if the LMS 114, or location software associated with the LMS 114, resides at the device 108, the option 524 can toggle on/off the ability of the device 108 to send location information to a remote system or node intending to use the location information for emergency uses. In the event that an override is included in the emergency use option 524, the option 524 can instruct the device 108 or LMS 114 to send information to a remote system or node intending to use the information for emergency uses, irrespective of other, possibly conflicting, settings of the LMS 114 or device 108.

The location sharing submenu 510 can also include an authentication option 526 for Toggling "on"/off an authentication requirement. In some embodiments, the authentication option 526 can be used to require authentication before allowing location information to be sent, requested, and/or used by a device 108, the LMS 114, a network node, and/or a third party. The authentication can be one or more passwords, speech commands, numerical codes, biometric data, and the like. Requiring authentication can prevent unauthorized parties from allowing location information requests or uses that are within established rules, but occur without the user's permission.

The WUI 500 can also include an "Update Preferences" option 528. A user can select the desired settings and select the "Update Preferences" option 528 to submit the selected preferences to the LMS 114. The submitted preferences can update or replace the preferences 218 stored at the LMS 114. Additional options can be included. For example, a "Reset to Default" option 530 can be included to allow a user to automatically set the preferences to the default settings. Additionally, a user or other authorized entity can configure multiple option configurations and store the multiple configurations. A user can select and apply one or more configurations, if desired. A logout option 532 can be included to sign the user out of an authenticated session used for updating the user's preferences. Additional and/or alternative options are possible and contemplated.

Figure 6:
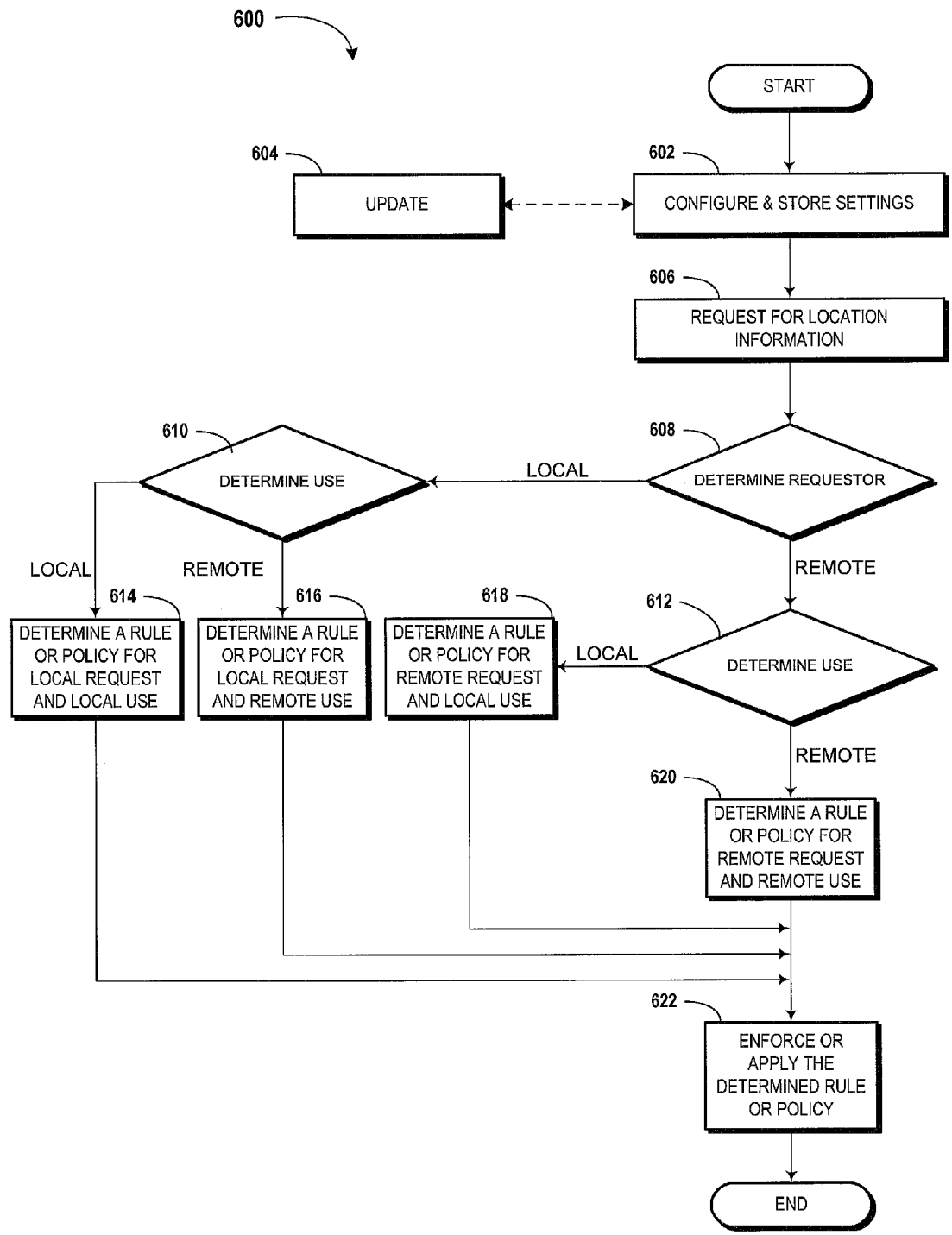
FIG. 6 illustrates a method for providing class structured location services, according to an exemplary embodiment of the present disclosure.

FIG. 6 schematically illustrates a method 600 for providing class structured location based services, according to an exemplary embodiment of the disclosure. It should be understood that the steps of the method 600 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 600 can be ended at any time. Some or all steps of this process, and/or substantially equivalent steps, can be performed by execution of computer-readable instructions included on a computer readable medium.

To avoid complicating the disclosure, the following description will describe in general terms performance of methods embodying some concepts of the disclosure. In reading the description of the several methods herein, and not only the exemplary method 600 of FIG. 6, it should be understood that a user can interact with a LMS 114 using a telephone user interface (TUI), a GUI, a web UI, and/or another UI. Alternatively, a user can interact with the device 108, and the device 108 can handle all communication needed to instruct the LMS 114 how to carry out the user's desired actions. Additionally, as explained above, the LMS 114 can reside on the device 108, in which case the user can interface with the device 108 to control the LMS 114. Therefore, DMTF-driven TUI's, icon-based GUI's, touch-sensitive and multi-touch sensitive screen GUI's, voice-driven TUI's, and the like are included in the following description and are included in the scope of the appended claims.

The method 600 begins, and flow proceeds to block 602, wherein the settings and/or preferences of the LMS 114 are configured by an authorized entity and stored. The configuration and storage of LMS 114 preferences can occur when the device is purchased, for example, by a retailer who activates the device 108, for example. In some embodiments, the purchaser specifies the settings for the LMS 114 during the activation process and the settings are recorded to the device SIM 330, or to another internal storage device, such as a memory 304. In some embodiments, the settings are configured during setup and saved to the purchaser's account settings. Various authentication and/or verification steps can be required to change the LMS 114 settings, if desired, to prevent alteration of the LMS 114 settings absent the purchaser's authorization. In some embodiments, the LMS 114 includes client software on the device 108. An authorized entity adjusts the settings at the device 108, for example, via a GUI or the like, and the settings can be communicated to the LMS 114. In some embodiments, the device 108 includes the hardware and software necessary to provide the functionality of the LMS 114. As such, the LMS 114 can be configured by a user of the device 108. In some embodiments, a user interfaces with an LMS client on the network via a web UI, a TUI, a human interface, for example, a customer service representative, and the like. In still other embodiments, the LMS 114 settings can include one or more rules or policies determined by a network operator, in which case the settings can be set by a network operator or other authorized entity. Regardless of the method used to configure the LMS 114, and as illustrated at optional block 604, the settings can be updated by an authorized party. The updating of the LMS 114 settings can occur at almost any time. If the ability to update settings is included, the settings can be updated repeatedly before a request for location is received.

At some time, as shown at block 606, a request for location information can be received by the LMS 114. The request can be made by an application running on the device 108, by a third party, by an application running on a communications network 100, by an emergency responder, or by another entity, for example. Local requests for location information can include, for example, a user activating a GPS application at the device 108, or another location-based service for which the device 108 attempts to determine a location. Remote requests for location information can include, for example, a remote system sending a request to a device 108 for current location information to use to customize advertising. Other examples include, but are not limited to, tracking the device 108, providing location-specific services, for other purposes, and the like. Additionally, the requested location information, whether locally or remotely requested, can be consumed or used by a local system, by a remote system, or both. For example, a remote system such as a web server can use location information remotely to tailor services, advertising, weather, traffic, and the like, for a user, or for tracking or other purposes. A local system such as a mapping location, for example, can use the location locally to provide location-based services such as navigation.

As illustrated at block 608, the LMS 114 can determine the source of the request, i.e., whether the requestor is local or remote to the device 108. The determination as to who is making the request can be made, for example, by determining what application is requesting the location information and determining if the application is local or remote to the device 108. In some embodiments, the LMS 114 can request or receive information from the communications network 100 relating to network traffic to determine if the request is made from the device 108, or a node remote to the device 108. Additionally, or alternatively, the device 108 can pass information to the LMS 114 regarding the source and or proposed use of the location information each time a request for location information is made or received. In some embodiments, the device 108 passes information to the LMS 114 each time a remote request is made or received.

In the illustrated exemplary method 600, the requestor can be a local requestor or a remote requestor. If the requestor is a local application or user, the method 600 can proceed to block 610, wherein the LMS 114 can determine the intended local use of the location information. If the requestor is a remote application, user, system, network, or node, the method 600 can proceed to block 612, wherein the LMS 114 can determine the intended remote use of the location information.

Returning now to block 610, if the LMS 114 determines that the location information is intended for local use by the device 108, the LMS 114 can retrieve a rule or policy based upon a local request for location information, and local use of the requested location information, as illustrated at block 614. As explained above, the rules or policies retrieved by the LMS 114 can be updated or set at almost any time by an authorized party. As such, the LMS 114 can store some rules and policies, or the LMS 114 can update the rules and policies at any time, on command, and/or each time a proposed use is presented to the LMS 114.

Returning now to block 610, if the LMS 114 determines that the location information is intended for use by a system that is remote to the device 108, for example, a node on a communications network 100, another user, a web page, and the like, the LMS 114 can retrieve a rule or policy based upon a local request for location information, and a remote use of the requested location information, as illustrated at block 616. The rule or policy can be used by the LMS 114 to allow or disallow the granting or use of the location information. It should be understood that the rule or policy retrieved at block 614 can be different, substantially different, substantially similar, or even identical, to the rule or policy retrieved at block 616, depending upon the preferences 218, policies 220, settings, and/or configurations of the LMS 114.

Returning now to block 612, if the LMS 114 determines that the location information is intended for local use by the device 108, the LMS 114 can retrieve a rule or policy based upon a remote request for location information, and local use of the requested location information, as illustrated at block 618. As explained above, the rules or policies retrieved by the LMS 114 can be updated or set at any time by an authorized party. As such, the LMS 114 can store some rules and policies, or the LMS 114 can update the rules and policies at any time, on command, and/or each time a proposed use is presented to the LMS 114.

If the LMS 114 determines, at block 612, that the location information is intended for use by a system that is remote to the device 108, for example, a node on a communications network 100, another user, a web page, and the like, the LMS 114 can retrieve a rule or policy based upon a remote request for location information, and a remote use of the requested location information, as illustrated at block 620. The rule or policy can be used by the LMS 114 to allow or disallow the granting or use of the location information. It should be understood that the rule or policy retrieved at block 618 can be different, substantially different, substantially similar, or even identical, to the rule or policy retrieved at block 620, depending upon the preferences 218, policies 220, settings, and/or configurations of the LMS 114. Furthermore, it should be understood that the LMS 114 can use the variables, policies, preferences, regulations, and the like, to associate the request with a class of requests. The rules and policies can prescribe treatment for certain classes of requests. For example, local use requests can be classified as "always grant" requests. When the LMS 114 receives an "always grant" request, the LMS 114 can provide the request. Other classes can include "sometimes grant," "never grant," "never grant without authentication," "never grant without user feedback," "never grant without an override condition," and the like. The LMS 114 can determine a rule or policy and enforce or apply the determined rule or policy. It should be appreciated that the determining a rule or policy and enforcing the rule or policy can include determining a class of service, determining the associated treatment for that class, and implementing the class treatment for the request, for example.

The method can proceed to block 622, wherein the LMS 114 can apply and/or enforce the rule or policy determined and retrieved at blocks 608-620. As explained above, application and/or enforcement of a rule or policy can include the device 108, the LMS 114, or another node on the communications network 100, preventing passage of the request for location information to a device 108, prevention or allowance of a request for location information, fulfillment of a request for location information, denial of a request for location information, determination of the location information and passage to the requesting party, and the like. An exemplary embodiment for applying or enforcing the determined rule or policy will be described in more detail below with reference to FIG. 7. The method 600 can end.

Figure 7:
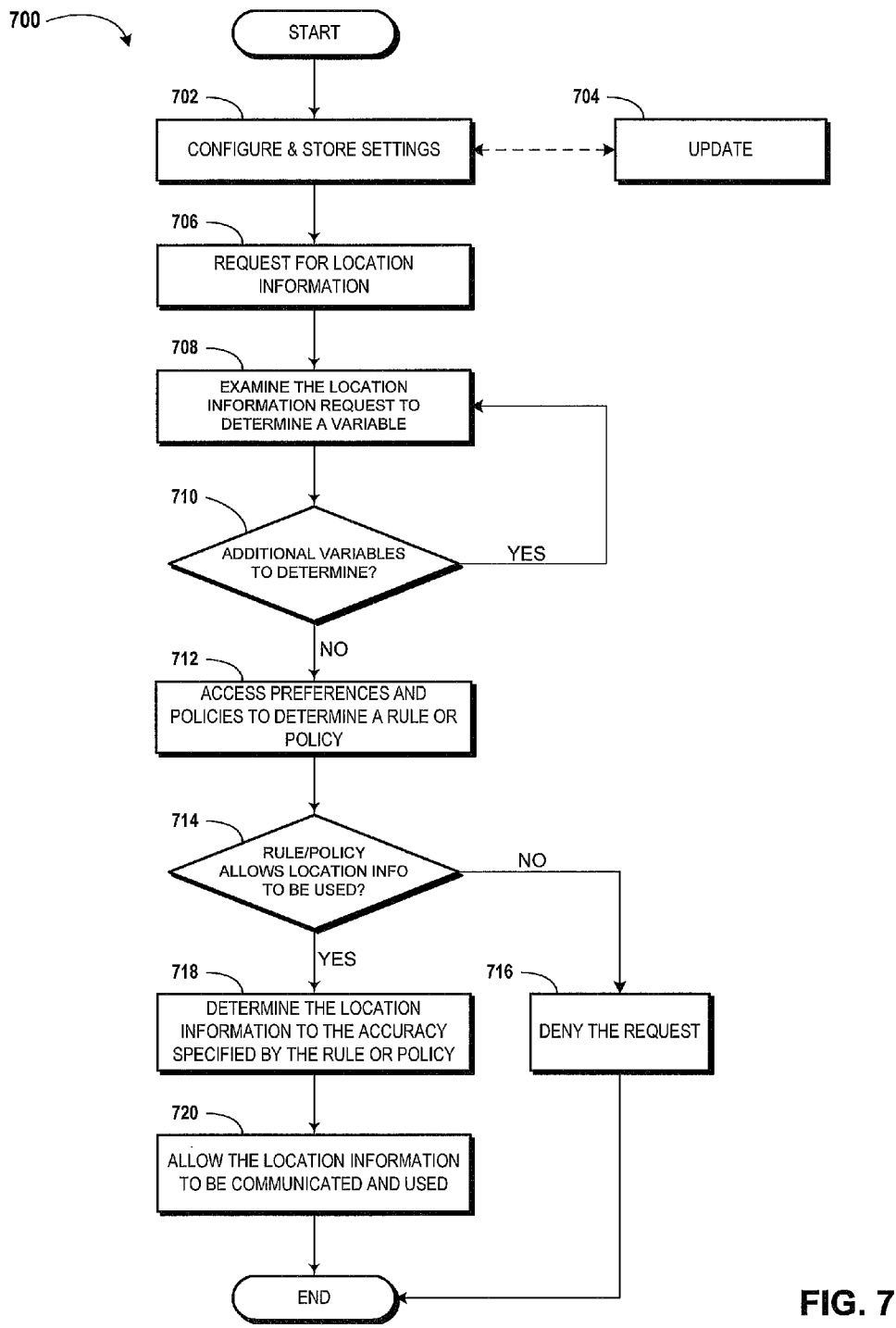
FIG. 7 illustrates a method for providing class structured location services, according to another exemplary embodiment of the present disclosure.

FIG. 7 schematically illustrates a method 700 for providing class structured location based services, according to another exemplary embodiment of the disclosure. It should be understood that the steps of the method 700 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 700 can be ended at any time. Some or all steps of this process, and/or substantially equivalent steps, can be performed by execution of computer-readable instructions included on a computer readable medium.

The method 700 begins, and flow proceeds to block 702, wherein the settings and/or preferences of the LMS 114 are configured by an authorized entity and stored. As explained above, the configuration and storage of LMS 114 preferences can occur when the device 108 is purchased and/or during the activation process. The settings can be recorded to the device SIM 330, or to another internal storage device. Additionally, the settings can be configured during setup and saved to the purchaser's account settings. Authentication and/or verification steps can be required to change the LMS 114 settings. In some embodiments, the LMS 114 includes client software on the device 108. In some embodiments, the device 108 includes the hardware and software necessary to provide the functionality of the LMS 114. In some embodiments, a user interfaces with a LMS client on the network via a web UI, a TUI, a human interface, for example, a customer service representative, and the like. In still other embodiments, the LMS 114 settings can include one or more rules or policies determined by a network operator, in which case the settings can be set by a network operator or other authorized entity. Regardless of the method used to configure the LMS 114, and as illustrated at optional block 704, some embodiments include updating, by an authorized party, LMS 114 settings. The updating of the LMS 114 settings, if possible, can occur at almost any time. In some embodiments, the settings can be updated repeatedly before a request for location is received.

At some time, as shown at block 706, a request for location information can be received by the LMS 114. The request can be made by an application running on the device 108, by a third party, by an application running on a communications network 100, by an emergency responder, or by another entity, for example. Local requests for location information can include, for example, a user activating a GPS application at the device 108, or another location-based service for which the device 108 attempts to determine the location of the device 108. Remote requests for location information can include, for example, a remote system sending a request to a device 108 for current location information to use to customize advertising. Other examples include, but are not limited to, tracking the device 108, providing location-specific services, and the like. Additionally, the requested location information, whether locally or remotely requested, can be consumed or used by a local system, by a remote system, or both. For example, a remote system such as a web server can use location information remotely to tailor services, advertising, weather, traffic, and the like, for a user, or for tracking or other purposes. A local system such as a mapping location, for example, can use the location locally to provide location-based services such as navigation.

At block 708, the LMS 114 can examine the location information request to determine a variable. A "variable," as used herein refers to an aspect of the location information request or proposed use that can vary depending upon the requesting entity, the intended use, the location, the time, the recipient, current policies, laws, standards, the network, any other aspect, combinations thereof, and the like. The LMS 114 can be provided with various rules or policies according to which the LMS 114 examines the location information request to determine a variable. At block 710, the LMS 114 can determine if there are additional variables to consider. If the LMS 114 so determines, the method 700 can again iterate the steps illustrated at block 708, another variable can be determined, and the method 700 can again proceed to block 710, wherein the LMS 114 can again determine if there are additional variables to consider. The steps of blocks 708-710 can be iterated until all possible variables have been determined by the LMS 114. Although not illustrated in FIG. 7, it should be appreciated that certain override variables can be included in the request, for example, as discussed above, an indication that the requesting party is an emergency responder. In the event that an override variable is included in the request, the method 700 can determine a rule or policy associated with the override variable, implement the variable, and the method 700 can end.

Returning now to block 710, once the LMS 114 has determined all necessary variables of the location information request, the method 700 can proceed to block 712, wherein the LMS 114 can access the preferences 218 and policies 220 to determine a rule or policy corresponding to the determined variables. It should be appreciated that complicated applications are sometimes required to determine the appropriate rule due to the large number of variables, the conflicting rules that are sometimes applied to some variables, and the multiple personal preferences, company policies, governmental regulations, and the like, that must sometimes be considered. As such, the LMS 114 can use the variables, policies, preferences, regulations, and the like, to associate the request with a class of requests. The rules and policies can prescribe treatment for certain classes of requests. For example, emergency use requests can be classified as "always grant" requests. When the LMS 114 receives an "always grant" request, the LMS 114 can provide the request. Other classes can include "sometimes grant," "never grant," "never grant without authentication," "never grant without user feedback," "never grant without an override condition," and the like. The LMS 114 can determine a rule or policy and enforce or apply the determined rule or policy, as illustrated in blocks 714-720. It should be appreciated that the determining a rule or policy and enforcing the rule or policy can include determining a class of service, determine the associated treatment for that class, and implementing the class treatment for the request.

At block 714, the LMS 114 can determine if the location information should be used or provided. As explained above, the use and or provision of location information can occur at the device 108, at the LMS 114, at a location component 210, or at a node of the communications network 100. If the LMS 114 determines that the location information should not be provided or used, the LMS 114 can deny the request for location information, as illustrated at block 716, and the method 700 can end. If the LMS 114 determines that the location information should be provided, the LMS 114, the device 108, the location component 210, or a node of the communications network 100 can be instructed to determine the location of the device 108. As explained above, the LMS 114 can instruct the provision of location information to occur within the determined rules and/or policies, for example, limiting the location information to a certain accuracy, or the like. The determined location information can be allowed for use by the device 108, the LMS 114, a third party, or a node of the communications network 100, as illustrated at block 720. The method 700 can end.

It must be understood that the illustrated GUIs are exemplary only and other contemplated user interfaces, screen layouts, selection methods, and the like are contemplated, including an embodiment of the LMS 114 that does not provide a GUI at the user's device, the calling party's device, or either device. Furthermore, a selection can be made using various embodiments of softkeys and/or key selections on a mobile or stationary telephone keypad, for example, and is not limited to the illustrated GUI. Additional and/or alternative selector switches and joysticks can be used to select a desired option or icon corresponding to a desired option. Input methods can also include touch screens or voice commands. Any desired screen layout or format can be used, including plain text and icons, for example.

While enforcement or application of the determined rules, preferences, policies, and the like have not been described in detail, it should be understood that the LMS 114 can communicate a rule, preference, or policy to the device 108 or a node on the communications network 100. The device 108 or the communications network 100, via a node thereon, can enforce the policy, if desired. The specification has referred to "rules," "preferences," and "policies" as being used to restrict the availability or use of location information. For purposes of the appended claims, the word "rules," and variants thereof, is used in to refer collectively to rules, policies, preferences, and other data that is used to determine how to classify a request or proposed use of location information.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system, for managing location based services provided to a wireless device, comprising:
    at least one non transitory computer-readable memory comprising instructions:
    a processor, in communication with the memory and configured to execute the instructions to:
        analyze a request for wireless device location information;
        classify the request into one of four classes of request;
        determine whether the location information should be provided based on the class, of the four classes, into which the request is classified; and
        initiate provision of the location information in response to determining that the location information should be provided; wherein:
    (A) initiating provision of the location information includes:
        (1) determining a source of the request for location information;
        (2) determining a manner by which to obtain the location information based on the source of the request; and
        (3) initiating determination of the location information according to the manner determined; and
    (B) each of the four classes is stored at a memory, and the four classes comprise:
        (1) a first class, wherein:
            (a) the request for the location information is initiated at the wireless device; and
            (b) the location information is intended for use to provide a location based service at the wireless device;
        (2) a second class, wherein:
            (a) the request for the location information is initiated at the wireless device; and
            (b) the location information is not intended for use to provide a location based service at the wireless device;
        (3) a third class, wherein:
            (a) the request for the location information is not initiated at the wireless device; and
            (b) the location information is intended for use to provide a location based service at the wireless device; and
        (4) a fourth class, wherein:
            (a) the request for the location information is not initiated at the wireless device; and
            (b) the location information is not intended for use to provide a location based service at the wireless device.

2. The system of claim 1, wherein the source determined includes a source selected from a group consisting of:
    a user of the wireless device; and
    a non-user of the wireless device.

3. The system of claim 1, wherein the manner determined includes a manner selected from a group consisting of:
  triangulation; and
  global positioning system.

4. The system of claim 1, wherein:
  the memory and the processor are remote to the wireless device; and
  the instructions further cause the processor to, in initiating provision of the location information, initiate transmission of a rule, from the processor remote to the wireless device, to the wireless device.

5. The system of claim 1, wherein:
  the memory and the processor are components of the wireless device; and
  the instructions further cause the processor to, in initiating provision of the location information, initiate transmission of a rule, from the wireless device, to an entity remote to an entity remote to the wireless device.

6. The system of claim 1, wherein:
  the request includes a variable; and
  the instructions, in causing the processor to classify the request into one of four classes of request, cause the processor to classify the request based on the variable.

7. A method, for managing providing management of location based services for a wireless device, comprising:
  analyzing a request for wireless device location information;
  classifying the request into one of four classes of request;
  determine whether the location information should be provided based on the class, of the four classes, into which the request is classified; and
  initiate provision of the location information in response to determining that the location information should be provided;
  wherein:
  (A) initiating provision of the location information includes:
    (1) determining a source of the request for location information;
    (2) determining, a manner by which to obtain the location information based on the source of the request; and
    (3) initiating determination of the location information according to the manner determined; and
  (B) each of the four classes is stored at a memory, the four classes comprise:
    (1) a first class, wherein:
      (a) the request for the location information is initiated at the wireless device; and
      (b) the location information is intended for use to provide a location based service at the wireless device;
    (2) a second class, wherein:
      (a) the request for the location information is initiated at the wireless device; and
      (b) the location information is not intended for use to provide a location based service at the wireless device;
    (3) a third class, wherein:
      (a) the request for the location information is not initiated at the wireless device; and
      (b) the location information is intended for use to provide a location based service at the wireless device; and
    (4) a fourth class, wherein:
      (a) the request for the location information is not initiated at the wireless device; and
      (b) the location information is not intended for use to provide a location based service at the wireless device.

8. The method of claim 7, wherein:
  the communicating is initiated remote to the wireless device; and
  initiating provision of the location information comprises initiating transmission of a rule, from remote to the wireless device, to the wireless device.

9. The method of claim 7, wherein:
  the communicating is initiated at the wireless device; and
  initiating provision of the location information comprises initiating transmission of a rule, determined at the wireless device, to an entity remote to the wireless device.

10. The method of claim 7, wherein the source determined includes a source selected from a group consisting of:
  a user of the wireless device; and
  a non-user of the wireless device.

11. The method of claim 7, wherein the manner determined includes a manner selected from a group consisting of:
  triangulation; and
  global positioning system.

12. The method of claim 7, wherein initiating provision of the location information, includes initiating transmission of a rule, from the processor remote to the wireless device, to the wireless device.

13. The method of claim 7, wherein initiating provision of the location information, includes initiating transmission of a rule, from the wireless device, to an entity remote to the wireless device.

14. The method of claim 7, wherein:
  the request includes a variable; and
  classifying the request into one of four classes of request includes classifying the request based on the variable.

15. A non-transitory computer-readable medium with having computer-readable instructions that, when executed, perform a process comprising:
  analyzing a request for wireless device location information;
  classifying the request into one of four classes of request;
  determine whether the location information should be provided based on the class, of the four classes, into which the request is classified; and
  initiate provision of the location information in response to determining that the location information should be provided;
  wherein:
  (A) initiating provision of the location information includes:
    (1) determining a source of the request for location information;
    (2) determining a manner by which to obtain the location information based on the source of the request; and
    (3) initiating determination of the location information according to the manner determined; and
  (B) each of the four classes is stored at a memory, and the four classes comprise:
    (1) a first class, wherein:
      (a) the request for the location information is initiated at the wireless device; and
      (b) the location information is intended for use to provide a location based service at the wireless device;

(2) a second class, wherein:
- (a) the request for the location information is initiated at the wireless device; and
- (b) the location information is not intended for use to provide a location based service at the wireless device;

(3) a third class, wherein:
- (a) the request for the location information is not initiated at the wireless device; and
- (b) the location information is intended for use to provide a location based service at the wireless device; and (4) a fourth class, wherein:
- (a) the request for the location information is not initiated at the wireless device; and
- (b) the location information is not intended for use to provide a location based service at the wireless device.

16. The computer-readable medium of claim 15, wherein the source determined includes a source selected from a group consisting of:
- a user of the wireless device; and
- a nonuser of the wireless device.

17. The computer-readable medium of claim 15, wherein the manner determined includes a manner selected from a group consisting of:
- triangulation; and
- global positioning system.

18. The computer-readable medium of claim 15, wherein:
- the medium and the processor are remote to the wireless device; and
- the instructions further cause the processor to, in initiating provision of the location information, initiate transmission of a rule, from the processor remote to the wireless device, to the wireless device.

19. The computer-readable medium of claim 15, wherein:
- the medium and the processor are components of the wireless device; and
- the instructions further cause the processor to, in initiating provision of the location information, initiate transmission of a rule, from the wireless device, to an entity remote to a node of a cellular network operatively linked and in communication with the wireless device.

20. The computer-readable medium of claim 15, wherein:
- the request includes a variable; and
- the instructions, in causing the processor to classify the request into one of four classes of request, cause the processor to classify the request based on the variable.

* * * * *